REGENERATIVE PULSE TRANSMISSION CIRCUIT

Filed March 5, 1963

INVENTOR
WALTER HERBERT ERWIN WIDL
BY Hane and Nydick
ATTORNEYS 3,246,243

REGENERATIVE PULSE TRANSMISSION CIRCUIT

Walter Herbert Erwin Widl, Stockholm Hogdalen, Sweden, assignor to Telefonaktiebolaget L M Ericsson, Stockholm, Sweden, a corporation of Sweden Filed Mar. 5, 1963, Ser. No. 262,891
Claims priority, application Sweden, Apr. 5, 1962, 3,790/62
5 Claims. (Cl. 325—13)

The present invention refers to a regenerative pulse transmission circuit, intended to be fed by a pulse series with a definite pulse repetition frequency and arranged to generate an output pulse series with the same pulse repetition frequency as the pulse repetition frequency of the received pulse series. In data transmission equipments, for instance, there are one or more pulse generators on the transmission side which work with a certain repetition frequency and at the receiving side there are units which should work synchronously with the corresponding units on the transmission side even in such cases when transmitted data pulses have a frequency which is quite separated from said pulse repetition frequency. The purpose of the invention is to provide a pulse transmission circuit, which has good stability for possible interruptions in the transmission side and the receiving side in a transmission equipment, a quick start after a possible interruption in the pulse generation and an effective compensation for possible unwanted pulse displacements of transmitted data pulses.

A pulse transmission circuit formed according to the invention is characterized by a pulse forming circuit for generation of pulses with a definite duration on the basis of received pulses, a first pulse generating path, which is connected to the output side of the pulse forming circuit and comprises an active oscillator tuned to the mentioned pulse repetition frequency and arranged to be blocked during time periods when pulses from the pulse forming circuit appear, and a second pulse generating path, which is arranged to generate pulses on basis of the fed pulses and comprises a passive tuned circuit tuned to said pulse repetition frequency. The outputs of the two pulse generating paths are combined to provide a common output for the transmission circuit.

The invention will be further described in connection with the attached drawing, wherein.

Figure 1:
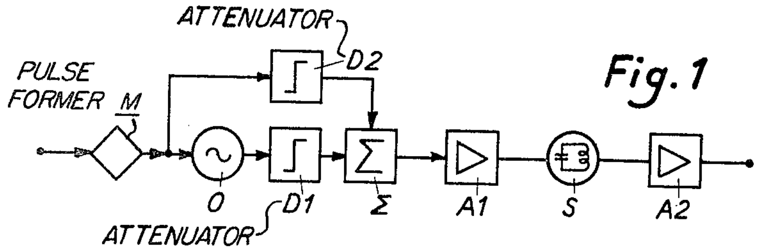
FIG. 1 is a block diagram of a pulse transmission circuit according to the invention.
Figure 3:
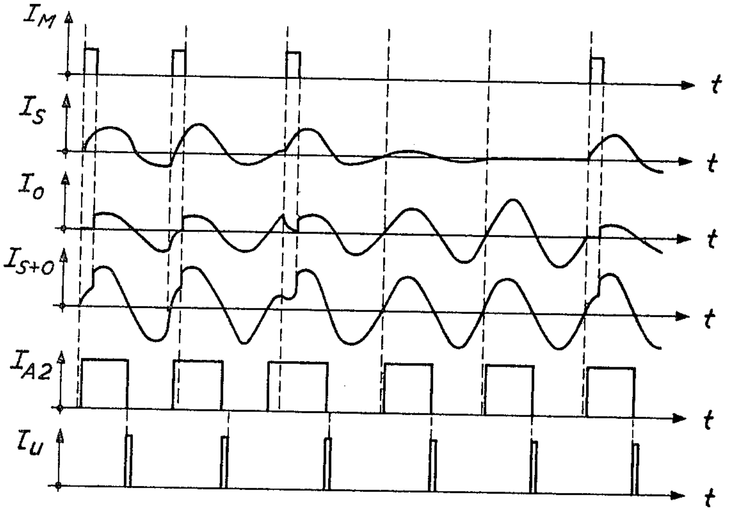
FIG. 3 shows a waveform diagram which facilitates the understanding of how a pulse transmission circuit according to FIG. 1 or 2 works.

The pulse transmission circuit according to FIG. 1 comprises a pulse forming circuit M, a first pulse generating path O–D1–Σ–A1–S and a second pulse generating path D2–Σ–A1–S. From the transmission side in a transmission equipment data pulses are transmitted to the inlet of the circuit M. The output circuit M transmits pulses with a definite time duration at instants of time which correspond to the appearance of the data pulses on the inlet side of the circuit M. In FIG. 3 the waveform diagram $I_M=f(t)$ shows typical pulses formed by the circuit M. The mentioned first pulse generating path O–D1–Σ–A1–S comprises a series circuit of gated free-running oscillator O with a rather high Q-value, an attenuator D1, a portion of adding circuit Σ, an amplifier A1 and a tuned circuit S with a rather low Q-value compared with the oscillator O. Oscillator O is tuned to the desired pulse repetition frequency and is arranged to be blocked during periods of time when pulses from the pulse forming circuit M are present. In FIG. 3 the diagram $I_O=f(t)$ shows the pulses obtained from the oscillator O and passed by attenuator D1. From this diagram it appears that during the period of time during which the first pulse from the circuit M is present, the oscillator O is blocked and consequently transfers no energy to its output side. When the mentioned first pulse ceases the oscillator O immediately starts in such a phase position that the pulse on its outlet side has a zero crossing or passage at an instant when the following pulse, appearing at the right point of time from the circuit M, is expected to begin. In FIG. 3, however, it is intended that the second pulse $I_M$ from the circuit M occurs somewhat too early because the corresponding data pulse has arrived somewhat too early. The pulse forming circuit M is constructed so that its generated pulses have such a duration that, at the time for the arrival of a data pulse, any possible remaining oscillation energy in the oscillator O will surely have time to be conducted away before the corresponding generated pulse $I_M$ ceases. From the third waveform diagram in FIG. 3 it is prefectly clear, that at the time for the end of the second pulse $I_M$, the outlet magnitude of the oscillator has decreased to zero and then immediately started with a jump of the same kind as after the end of the first pulse $I_M$. The third pulse $I_M$ from the circuit M is supposed to occur at the right time in relation to the first pulse $I_M$, that is, the distance between the second and the third pulse is larger than normal, and therefore the oscillator O manages to begin a second period before the third pulse $I_M$ starts. Even in this case, the remaining oscillation energy of the oscillator O has time to be conducted away before the end of the third pulse $I_M$ and after that the oscillator continues to oscillate. After the third pulse $I_M$, there is a rather long time until the fourth pulse appears because no data pulses or potential changes occur in the data flow which can influence the pulse forming circuit M. The oscillator O continues to oscillate, and as it is very stable, its outlet magnitude has a zero passage just at the point of time when the fourth pulse $I_M$, generated at the right point of time, begins. It should already be apparent that a pulse transmission circuit according to the invention has the ability on the one hand, to flexibly follow possible displacements by individual data pulses or potential changes in a data flow, and on the other hand, to stably continue the pulse generation for long interruptions in the data flow.

The oscillations or pulses generated by the oscillator O pass through the units D1, Σ, A1 and S and arrive amplified at the inlet side of the amplifier A2.

The second pulse generating path D2–Σ–A1–S comprises a series connection of the attenuator D2 and the units Σ, A1 and S which are parts of the first pulse generating path. The attenuator D2, as well as the earlier mentioned attenuator D1, is used to prevent unwanted interactions between the paths. In FIG. 3 the diagram $I_S=f(t)$ shows the pulses appearing at the outlet side of the tuned circuit S in response to pulses generated in the second pulse generating path. This waveform diagram clearly shows that, at the time for the beginning of a pulse from the pulse forming circuit M, the tuned circuit S starts oscillating, since it is tuned to a frequency that corresponds to the desired pulse repetition frequency. At the time when the first pulse from the circuit M begins the tuned circuit S starts transmitting a positive half cycle lobe and generates then part of a negative half cycle lobe with smaller amplitude than the first positive half cycle lobe. At the time when the second pulse from the circuit M begins, the tuned circuit S again starts transmitting a positive half cycle lobe, but as said second pulse is assumed to arrive too early, this second positive half cycle lobe does not start from zero but from a point with a negative potential.

At the time when the third pulse from the circut M begins, the tuned circuit S starts again with a positive half cycle lobe but as the distance between the second and the third pulse is assumed to be larger than normal, this third positive half cycle lobe does not start from zero but from a point with positive potential. During the rather long period of time between the third and the fourth pulse from the circuit M, the circuit S rings with a smaller and smaller amplitude and then at the beginning of the fourth pulse it will again start a new oscillation.

Effectively, in the path between the tuned circuit S and the amplifier A2 there is a combining of the pulses generated in the path O–D1–Σ–A1–S according to the diagram $I_O=f(t)$ and the pulses generated in the path D2–Σ–A1–S according to the diagram $I_S=f(t)$. The, combining of these pulses is clear from FIG. 3 in the diagram $I_{S+O}=f(t)$. All these pulses are fed to an amplifier A2, which will be quite over-modulated or over-driven by the pulses, and thereby a number of rectangular pulses are obtained according to the diagram $I_{A2}=f(t)$ in FIG. 3. By means of a differentiating circuit (not shown, in the drawing), a pulse train with narrow pulses is obtained from these rectangular pulses according to the last diagram $I_u=f(t)$ in FIG. 3. From this last waveform diagram it is clear that a number of pulses are obtained on the outlet side of the transmission circuit having the same pulse interval even if the data flow entering the transmission circuit should be without pulses or polarity changes during certain periods of time, and that influence of small, unwanted displacements of pulses or polarity changes in the data flow will be gradually equalized. Consequently it is evident from, for instance, the last diagram in FIG. 3 that the first and fourth pulse arrive where they are meant to (to the right of the dotted line) while the other pulse is displaced about one pulse breadth (for instance owing to a displacement of an incoming data pulse) and the third pulse is displaced only half a pulse breadth. Thus the conditions are very good for the maintenance of the synchronism between the transmission side and the receiving side of the transmission equipment.

Figure 2:
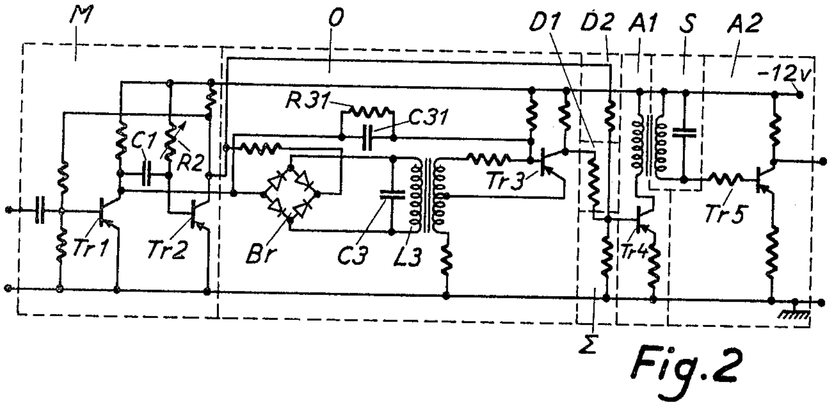
FIG. 2 is a schematic diagram of the pulse transmission circuit according to FIG. 1.

The circuit shown in FIG. 2 of a pulse transmission circuit according to the invention will now be further described. The pulse forming circuit M consists of a monostable switch with two transistors Tr1 and Tr2. Transistor Tr1 is normally blocked and fed with incoming data pulses, while transistor Tr2 is normally conductive. The collector of the first transistor Tr1 is connected to a junction (the left one) in a rectifier bridge Br and the collector of the second transistor Tr2 is connected to the diametrically situated junction point (the right) in the bridge. The rectifiers are so arranged, that when no data pulse is fed to the transistor Tr1, that is, when the transistor Tr1 is blocked and the transistor Tr2 is conductive, then the bridge operates as an open circuit while, contrary to this, when a data pulse is fed to the transistor Tr1 which conducts and the transistor Tr2 is blocked, then the bridge works as a short circuit in the circuit of which it is a part.

The pulse series $I_M=f(t)$ shown in FIG. 3 can be the pulse series obtained from the collector of the transistor Tr1. The duration of these pulses is determined by the time constant of capacitor C1, connected between the collector of the transistor Tr1 and the base of the transistor Tr2, and connected the variable resistor R2, connected between the base of the transistor Tr2 and the negative potential source −12 volt.

The pulse forming circuit M controls or gates the oscillator O by feeding suitable control voltages to the bridge Br in the inlet circuit of the oscillator. Further, the oscillator O comprises a transistor Tr3 and tuned circuit C3–L3, to which the bridge Br is parallely connected. Normally, the transistor Tr3 and the tuned circuit C3–L3 thus generate a sinusoidal voltage with a frequency corresponding to the desired pulse repetition frequency. However, when a data pulse appears on the inlet side of a transistor Tr1 a pulse is generated in the circuit M. During the duration of the generated pulse, the bridge Br works as a direct short-circuit in parallel with capacitor C3, that is the generating function of the oscillator is disabled during this pulse duration. The voltage jumps necessary for the proper function of the oscillator (shown in the diagram $I_O$ in FIG. 3) are adjusted by means of capacitor C31 and resistor R31 in a branch between the collector of the transistor Tr1 and the base of the transistor Tr3. The voltage generated by the oscillator O is fed through attenuator D1, consisting of a resistor, to the inlet side of the amplifier A1, which consists of a transistor Tr4, and may then pass the tuned circuit S and be fed to the inlet side of the amplifier A2, which consists of a transistor Tr5.

The control voltage on the collector of the transistor Tr2 of the pulse forming circuit M is fed through attenuator D2, consisting of a resistor, to the inlet side of the amplifier A1, and may then influence the tuned circuit S, that is, start its oscillation function. The oscillation generated by the tuned circuit S is then fed to the inlet side of the amplifier A2, which, consequently, is controlled by the sum of the magnitude generated by the oscillator O (active unit) and the magnitude generated by the tuned circuit S (passive unit).

It is evident that many modifications are possible for the arrangement now described rather in detail, without departing from the scope of the invention. For instance the two pulse generating paths can of course be quite separated from each other, that is, not being arranged with the several units (Σ, A1, S) in common as in the arrangement now described. Further the different units M, O, S and so on can be formed in many different ways and in ways which are well-known for the expert without the essential feature of the invention being anticipated. As regards FIG. 1 it can be said that the attenuator D2 can principally be connected to the inlet side of the circuit M instead of to its outlet side.

I claim:

1. A pulse-generating apparatus, adapted to receive pulses at a definite bit repetition frequency, for transmitting pulses mutually spaced by a fixed interval of time directly related to said definite bit repetition frequency, said pulse-generating apparatus comprising pulse-forming means for generating a pulse for each received pulse, gated oscillator means connected to said pulse-forming means for generating signals having a frequency equal to said definite bit repetition frequency, said gated oscillator means generating signals only during the intervals between pulses generated by said pulse-forming means, tuned circuit means connected to said pulse-forming means for at least transmitting a signal for each pulse generated by said pulse-forming means, said tuned circuit means having a resonant frequency equal to said definite bit repetition frequency, and pulse-shaping means, including an input for receiving the signals from said tuned circuit meansand said gated oscillator means, for transmitting a pulse for each signal received by said input.

2. The pulse-generating apparatus of claim 1, wherein said gated oscillator includes a resonant circuit having a Q-value greater than the Q-value of said tuned circuit means.

3. The pulse-generating apparatus of claim 1, wherein the duration of each pulse generated by said pulse-forming means blocks said gated oscillator means at least long enough for any oscillatory energy stored therein to be transferred as signal energy.

4. A pulse-generating apparatus, adapted to receive pulses at a definite bit repetition frequency, for transmitting pulses mutually spaced by a fixed interval of time directly related to said definite bit repetition frequency, said pulse-generating apparatus comprising pulse-forming means for generating a pulse for each received pulse, gated oscillator means connected to said pulse-forming means for generating signals having a frequency equal to said definite bit repetition frequency, said gated oscillator means generating signals only during the intervals between pulses generated by said pulse-forming means, tuned circuit amplifier means, including an input connected to said pulse-forming means and to said gated oscillator means and an output, for transmitting a signal for each signal received by said input from said gated oscillator means and a similar signal for each pulse received from said pulse-forming means, and means connected to the output of said tuned circuit amplifier means for transmitting a pulse for each signal transmitted by said output.

5. A pulse-generating apparatus according to claim 4, wherein said pulse-forming means includes a further output for transmitting a voltage step at the end of each pulse generated by said pulse-forming means, and wherein said gated oscillator means includes a tuned circuit and an amplifier, said amplifier including an input connected to said tuned circuit means and an output, said pulse-generating apparatus further comprising means for connecting said further output of said pulse-forming means to the input of the amplifier of said gated oscillator means.

References Cited by the Examiner

UNITED STATES PATENTS

| | | | |
|---|---|---|---|
| 2,474,490 | 6/1949 | Pelle | 178—70 |
| 2,499,225 | 2/1950 | Marshall | 325—13 |
| 2,502,942 | 4/1950 | Goodall | 178—70 |
| 3,131,310 | 4/1964 | Verstraelen | 307—88.5 |

DAVID G. REDINBAUGH, *Primary Examiner.*

B. V. SAFOUREK, *Assistant Examiner.*